United States Patent
Glass

(10) Patent No.: US 8,191,873 B2
(45) Date of Patent: Jun. 5, 2012

(54) DEVICE FOR LIMITING ROTATION OF AN AXLE IN A LEAF SPRING EYE AND SUSPENSION FEATURING SAME

(76) Inventor: Michael F. Glass, Indianapolis, IN (US)

( * ) Notice: Subject to any disclaimer, the term of this patent is extended or adjusted under 35 U.S.C. 154(b) by 290 days.

(21) Appl. No.: 12/619,729

(22) Filed: Nov. 17, 2009

(65) Prior Publication Data

US 2010/0127444 A1    May 27, 2010

Related U.S. Application Data

(60) Provisional application No. 61/117,322, filed on Nov. 24, 2008.

(51) Int. Cl.
*F16F 1/30* (2006.01)

(52) U.S. Cl. .......................................... 267/47; 267/270

(58) Field of Classification Search .................. 267/36.1, 267/38, 40–47, 260–269
See application file for complete search history.

(56) References Cited

U.S. PATENT DOCUMENTS

| | | | | | |
|---|---|---|---|---|---|
| 1,792,842 | A | * | 2/1931 | Jansson | 267/270 |
| 1,835,575 | A | * | 12/1931 | Sanders et al. | 403/225 |
| 2,010,177 | A | * | 8/1935 | Cramer | 267/261 |
| 2,342,339 | A | * | 2/1944 | Hendrickson | 267/47 |

FOREIGN PATENT DOCUMENTS

WO    WO 02/42099    *    5/2002

* cited by examiner

*Primary Examiner* — Christopher Schwartz
(74) *Attorney, Agent, or Firm* — Kyle R. Satterthwaite; Ryan W. Dupuis; Ade & Company Inc.

(57) ABSTRACT

A suspension system suitable for a trailer incorporates a device for limiting rotation of an axle received in an eye of a leaf spring. The leaf spring has a wrapped end defining the eye extending transverse to the leaf spring with a gap left between the leaf spring and the wrapped end thereof. The rotation limiting device is fixed to the axle and features a sleeve having a peripheral wall extending circumferentially about the axle inside the eye of the leaf spring and a tab projecting outward from the peripheral wall of the sleeve and extending in a direction parallel to the axis. The tab projects into the gap left between the leaf spring and the wrapped end thereof to block rotation of the axle and sleeve relative to the wrapped end of the leaf spring. Friction fit, adhesive, welding or multi-piece hardware fixing of the spring is avoided.

18 Claims, 4 Drawing Sheets

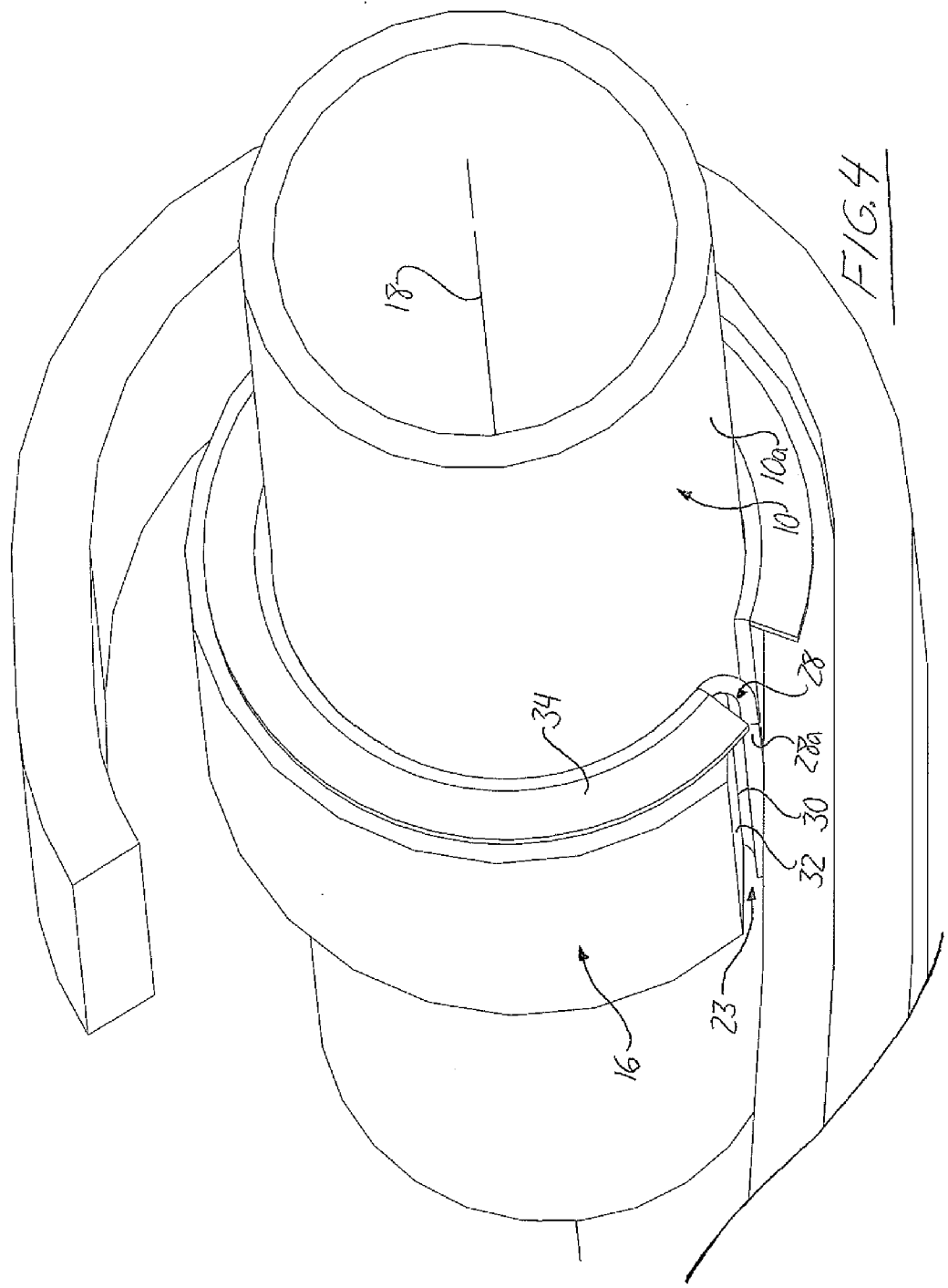

DEVICE FOR LIMITING ROTATION OF AN AXLE IN A LEAF SPRING EYE AND SUSPENSION FEATURING SAME

This application claims the benefit under 35 U.S.C.119(e) of U.S. provisional application Ser. No. 61/117,322, filed Nov. 24, 2008.

FIELD OF THE INVENTION

This invention relates generally to suspension systems, and more particularly to a device for limiting relative rotation between a vehicle axle and a leaf spring eye wrap in which the axle is supported.

BACKGROUND OF THE INVENTION

The international PCT application published under WO 02/42099, herein incorporated by reference, discloses a suspension system for a trailer, featuring a pair of leaf springs extending longitudinally of the trailer frame on respective opposite sides thereof. Each leaf spring is cantilevered with one end connected to the frame and its opposite otherwise free end secured to an axle of the trailer. This prior art application teaches that the an eye-forming wrapped around end of the leaf spring may be push-fitted, friction-fitted, adhered, puddle or full welded, bolted, clip-secured or clamp-secured to the axle to rigidly fix these two elements together to prevent relative motion therebetween. The fitted, adhered, and welded options are generally not easily serviceable without special equipment. Also, spring steel generally does not weld properly to steel axles. The bolted, clip-secured, and clamp-secured options require multiple hardware pieces causing increased complexity at greater cost. As a result, it is desirable to provide an alternative arrangement for mounting an axle within an eye wrap of a leaf spring in a way that prevents rotation of the axle within the spring eye.

The solution proposed herein is not limited to use in the context of the light trailer suspension system taught in the aforementioned prior art patent application, and may be readily applied in other suspension contexts where it is desirable to limit or prevent rotation of an axle received in the eye wrap of a leaf spring.

SUMMARY OF THE INVENTION

According to a first aspect of the invention there is provided a device for limiting rotation of an axle received in an eye of a leaf spring's wrapped end, the device comprising:

a sleeve having a peripheral wall extending about an axis and dimensioned to fit circumferentially about the axle inside the eye of the leaf spring; and a tab projecting outward from the peripheral wall of the sleeve and extending in a direction parallel to the axis;

whereby, with the sleeve fixed to the axle to extend thereabout within the eye of the leaf spring and the tab projecting into a gap left between the leaf spring and the wrapped end thereof, contact between the tab and the leaf spring blocks rotation about the axis of the axle and sleeve relative to the wrapped end of the leaf spring.

Preferably there is provided a flange projecting outward from the peripheral wall of the sleeve at positions spaced from the tab about the axis.

Preferably the flange is situated at an end of the sleeve

Preferably the tab is integral with the peripheral wall of the sleeve.

Preferably the tab is defined by a bent portion of the peripheral wall.

Preferably the sleeve is split to form a break in the peripheral wall thereof and the bent portion of the peripheral wall is formed by an end thereof defined at a respective side of the break.

Preferably the tab is bent back over itself between a proximate end of the tab connected to the peripheral wall of the sleeve and a distal end of the tab opposite the connection thereof to the sleeve.

Preferably the tab smoothly curves from the proximate end of the tab to the distal end of the tab.

According to a second aspect of the invention there is provided a suspension system comprising:

a leaf spring having a wrapped end defining an eye extending along an axis transverse to the leaf spring with a gap left between the leaf spring and the wrapped end thereof;

an axle received in the eye of the leaf spring;

a rotation limiting device fixed to the axle and comprising a sleeve having a peripheral wall extending circumferentially about the axle inside the eye of the leaf spring and a tab projecting outward from the peripheral wall of the sleeve and extending in a direction parallel to the axis, the tab projecting into the gap left between the leaf spring and the wrapped end thereof to block rotation about the axis of the axle and sleeve relative to the wrapped end of the leaf spring by contact between the tab and the leaf spring.

Preferably the rotation limiting device further comprises a flange projecting outward from the peripheral wall of the sleeve at positions spaced from the tab about the axis outside the eye on a respective side of the leaf spring.

Preferably the flange is disposed on an inner side of the leaf spring opposite an end of the axle adjacent the leaf spring.

Preferably the tab is bent about an end edge formed at the intersection of an inner surface of the leaf spring's wrapped end facing into the eye and an end surface of the leaf spring's wrapped end defining one side of the gap between the wrapped end and the leaf spring.

Preferably the tab smoothly curves about the end edge.

Preferably the rotation limiting device is welded to the axle.

BRIEF DESCRIPTION OF THE DRAWINGS

In the accompanying drawings, which illustrate exemplary embodiments of the present invention:

FIG. 4 is a close-up perspective view of the assembly of FIG. 1, showing rotation blocking positioning of a tab of the sleeve device within a gap left at the end of an eye wrap of the leaf spring.

DETAILED DESCRIPTION

Figure 1:
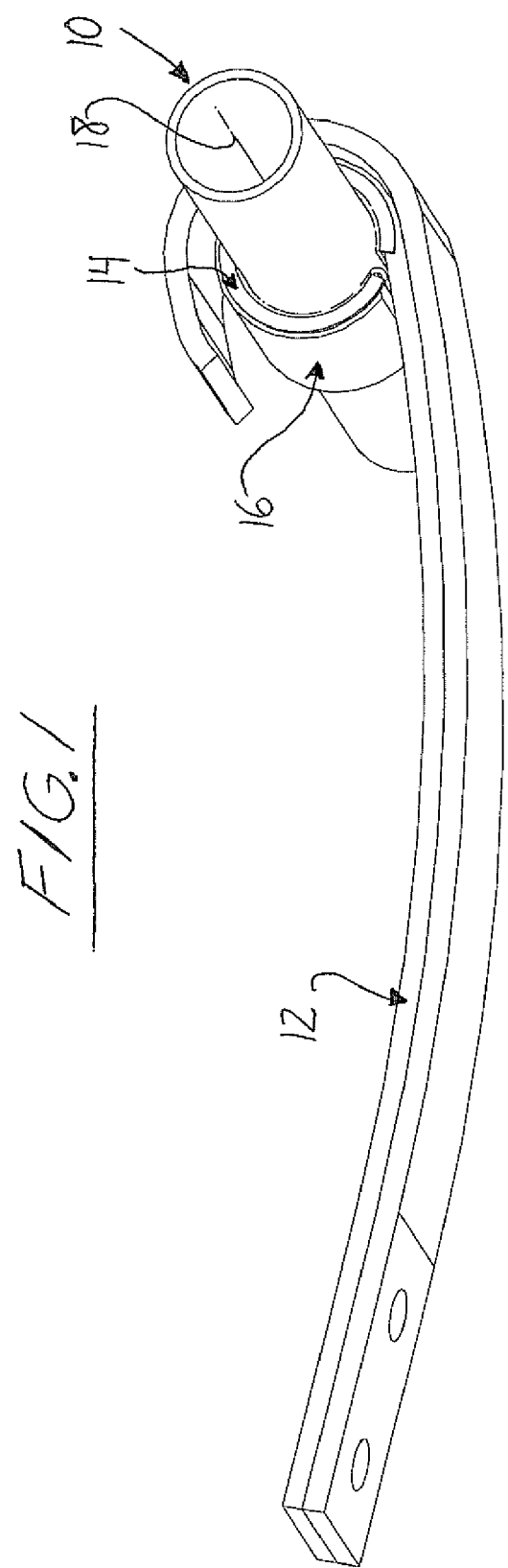
FIG. 1 is a perspective assembled view of a leaf spring pairing carrying an axle fitted with a rotation blocking sleeve device according to the present invention.

FIG. 1 shows an axle tube 10 received in a cylindrical eye opening extending transversely across a leaf spring 12 at a wrap-around end thereof defining the eye opening. This arrangement differs from prior art axle and leaf spring eye wrap assemblies in that a locking sleeve device 14 is fixed to the axle 10 to extending thereabout on the periphery thereof so as to fit concentrically between the coaxial eye wrap 16 and axle 10. As described herein below in further detail, the locking sleeve device 14 is designed to limit rotation of the axle relative to the eye wrap of the leaf spring without requiring welding, bolting or clamping to the spring itself.

Figure 2:
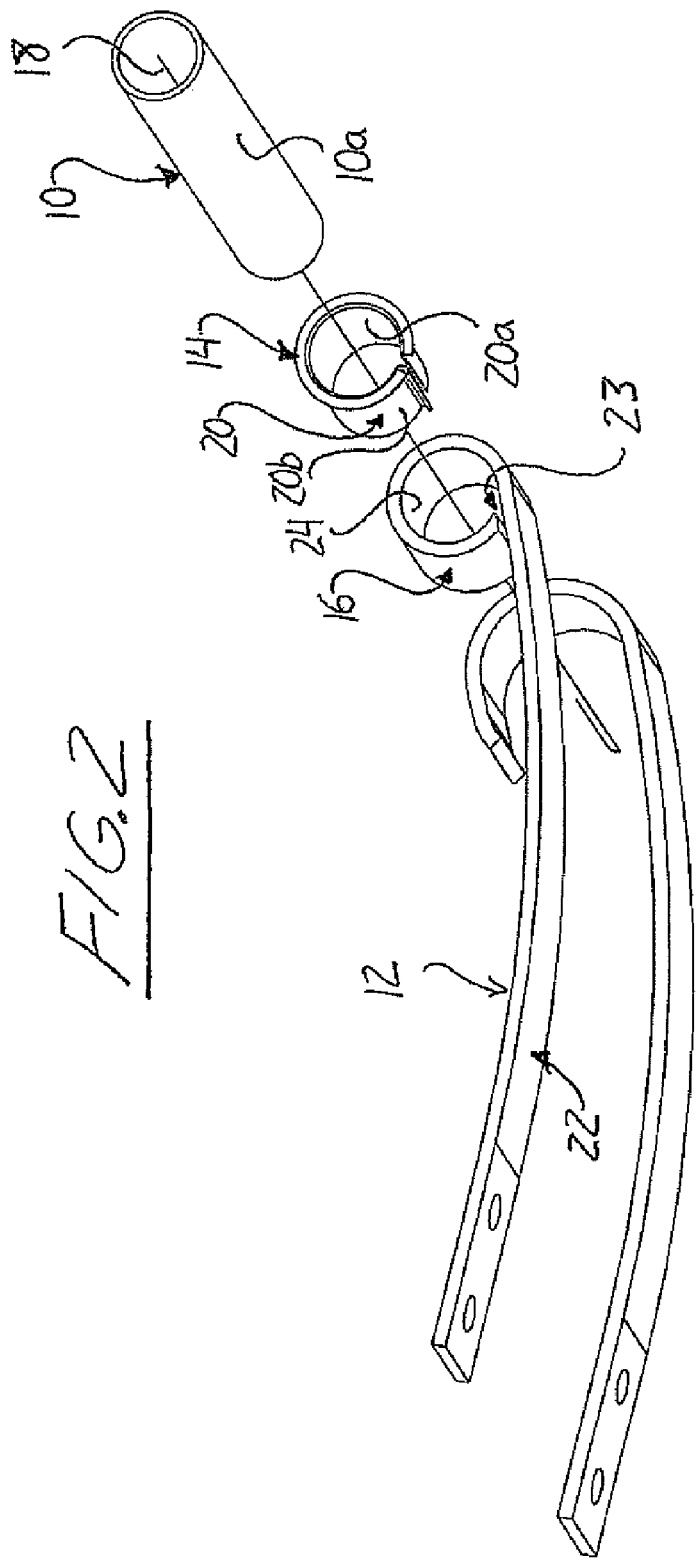
FIG. 2 is a perspective exploded view of the leaf spring pairing, axle and sleeve device of FIG. 1.

FIG. 2 shows the assembly of FIG. 1 in an exploded state. The axle tube 10, the locking sleeve 14 and the eye wrap 16 of the leaf spring 12 are concentrically coaxial, as illustrated by their aligned positioning on common axis 18. The locking sleeve 14 features a peripheral wall 20 closing substantially, but not fully, around the axis 18 along a circumferential cylindrical path thereabout, defining the generally cylindrical shape of the locking sleeve. The sleeve's peripheral wall 20 has an inner diameter dimensioned to fit its inner surface 20a against the outer peripheral surface 10a of the hollow cylindrical axle tube 10.

In a conventional manner, the eye wrap 16 of the leaf spring is formed by a wrapped end thereof extending along a circular path from where it integrally diverts from the elongate central portion 22 of the spring 12 so as to curve back over itself and nearly close fully around the cylindrical eye opening traversing the spring, but leaving a small gap 23 between a free distal end of the eye wrap 16 and a broad surface of the central portion of the leaf spring facing the side thereof to which the wrapped end curves. The outer diameter of the sleeve's uniform thickness peripheral wall 20 is dimensioned to fit its outer surface 20b adjacent to and face-to-face with the inner surface 24 of the eye wrap 16, which is defined by the aforementioned broad surface of the spring 12 where it diverts from the portion of the broad surface at the central portion 22 of the spring to extend along a cylindrical path about the axis 18.

Figure 3:
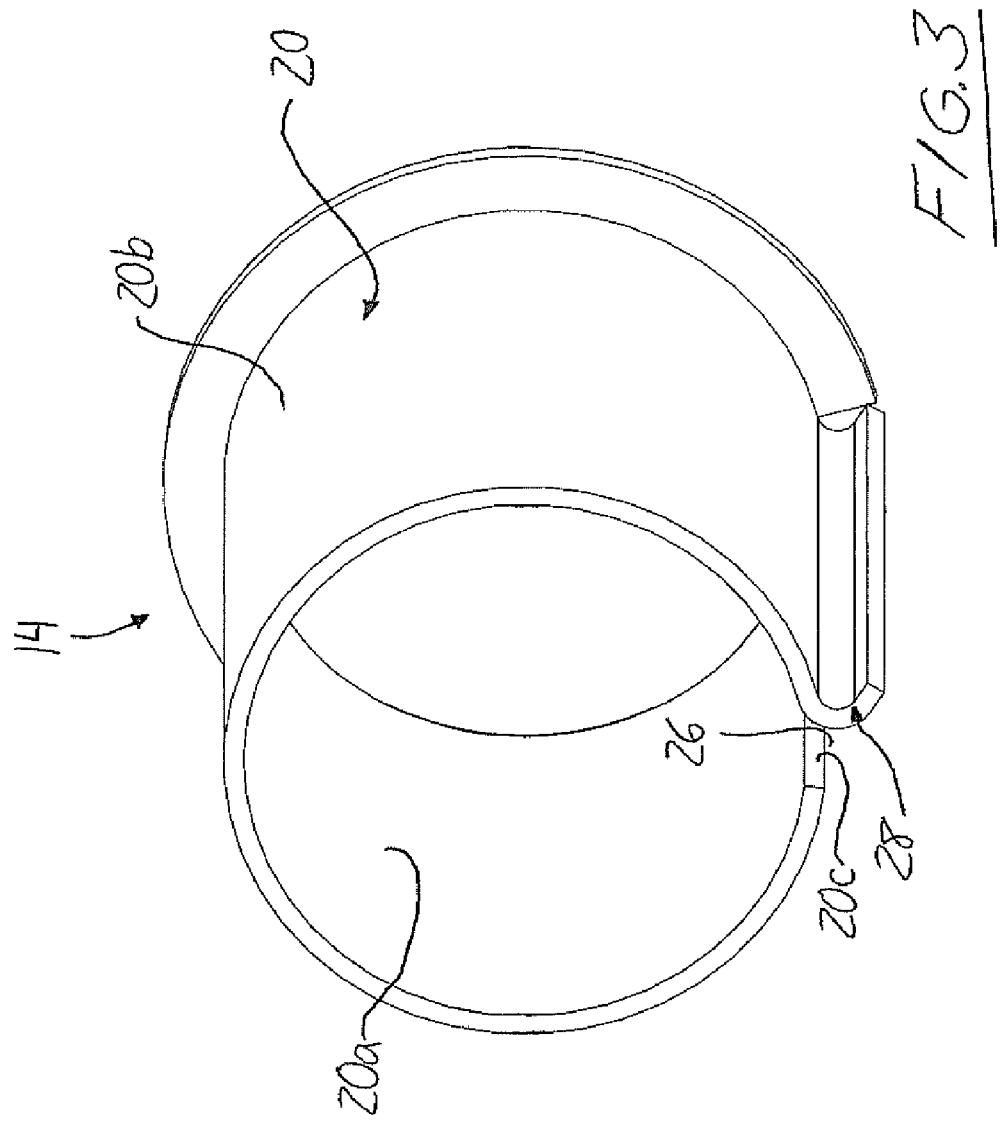
FIG. 3 is an isolated perspective view of the sleeve device of FIG. 1.

With reference to FIGS. 3 and 4, as the peripheral wall 20 of the sleeve 14 does not quite close fully about the axis 18, a break 26 extending parallel to the axis 18 is left in the otherwise cylindrical peripheral wall. At one side of this break 26, the peripheral wall 20 ends at a flat edge surface 20c lying on the peripheral wall's cylindrical path about the axis 18. At the other side of the break 26, the peripheral wall 20 is bent in a curving manner to form an integral tab 28 deviating from the peripheral wall's circularly cylindrical path about the axis 18 and projecting outward from the peripheral wall's cylindrical path. The tab 28 smoothly curves back over itself through more than ninety degrees but less than one hundred and eighty degrees so as to give the tab 28 a hook-like cross section in a plane normal to the axis 18.

With reference to FIG. 4, the tab 28 thus forms a hook or catch that wraps, bends or curves around an edge 30 formed at the intersection of the inner surface 24 of the leaf spring's wrapped end and an end surface 32 of the leaf spring's wrapped end defining one side of the gap 23 between this free end of the leaf spring's wrapped end portion and the broad surface of the leaf spring's central portion. A distal end 28a of the tab opposite its proximal end integrally connected with the peripheral wall 20 of the sleeve is thus disposed within the gap 23 of the eye wrap 16. The cross section of the tab 28 is uniform along the axis 18 and features a short end portion linearly connecting the curved portion of the tab wrapped about the end edge 30 of the eye-wrap 16 to the distal end 28a of the tab 28, this end portion of the tab extending generally along the broad surface of the leaf spring's central portion at the integral connection of the leaf spring's central portion 22 and wrapped end 16 between this broad surface and the end surface 32 of the eye wrap facing this broad surface.

Still referring to FIG. 4, clockwise rotation of the sleeve 14 about the axis 18 is blocked by contact of the curved portion of the tab 28 with the end edge 30 of the eye wrap 16, and opposite rotation of the sleeve 14 is blocked by contact of the curved portion or straight end portion of the tab 28 with the broad surface of the central portion 22 of the leaf spring or the integral inner surface 24 of the eye wrap 16. Rotation of the sleeve 14, and the axle 10 to which it is fixed, is thus prevented or at least limited to a very minute range created by allowance of small movement of the tab between contact with the eye wrap end edge 30 and contact with the broad surface of the leaf spring due to manufacturing tolerances. The sleeve can thus be welded to the axle and installed within the spring eye to position the tab 28 within the wrapped end eye gap 23, thereby effectively preventing rotation of the axle relative to the spring eye without requiring welding to the spring itself or multi-piece bolting or clamping arrangements. The described spring eye, axle and sleeve arrangement may also be used as an alternative to leaf spring arrangements typically relying on a U-bolt and cradle arrangement to rigidly clamp an axle to an unwrapped or eye-lacking end of a different style of leaf spring.

The illustrated embodiment of the sleeve 14 features an end rim or flange 34 projecting radially outward from the outer surface 28b of the peripheral wall 20 in a planar manner at one end face thereof. The flange 34, like the peripheral wall 20, extends nearly but not quite fully about the axis 18, ending on either side of the break 26 in the peripheral wall. The flange 34 and the peripheral wall 20 are co-terminal at the flat edge surface 20c, with the other end of the flange being situated at the integral joining of the peripheral wall 20 and the tab 28, leaving the side of the tab 28 in a respective plane normal to the axis 18 exposed and free of direct connection to the flange 24.

In a suspension system of a trailer, using the context of the aforementioned PCT application to illustrate use of the locking sleeve 14, a wrapped-end leaf spring may be mounted to the frame of the trailer on respective opposite sides thereof, each spring being cantilevered from an eye-free unwrapped end thereof, for example by rigid mounting of the spring to a respective longitudinal frame member of the trailer by bolting thereto through a pair of bolt holes 36 proximate the unwrapped end of the spring. With each spring extending in the trailer's longitudinal direction, the springs are aligned along this longitudinal direction to support a single axle in the two spring eyes, each of which is equipped with a locking sleeve of the type described herein above. The flanges of the two locking sleeve's are either each situated against the outer side of the respective spring, opposite the central vertical plane of the trailer, or each situated against the inner side of the respective spring, adjacent the central vertical plane of the trailer. This way, sliding of the axle in each direction along its own axis transverse to the trailer's longitudinal direction is blocked by contact between one of the locking sleeve flanges 34 and the respective annular end face of the respective spring's eye wrap. The sleeves thereby not only prevent rotational movement of the axle relative to the springs, but also sliding movement, therefore acting to fix the axle relative to the springs with a welded or multi-piece connection thereto.

Preferably, the flanges of the two locking sleeve's are either each situated against the inner side of the respective spring, adjacent the trailer's central vertical plane extending the longitudinal direction thereof, so that installation of the spring can be effected by simply sliding the spring's eye onto the device over the respective end of the axle. In other words, preferably each flange is disposed on an inner side of the respective leaf spring, the inner side being opposite the respective wheel of the vehicle mounted on the nearest end of the axle adjacent and outside the leaf spring. The flanges of the two locking sleeve's are thus disposed between the two leaf springs disposed on opposite sides the trailer's central longitudinal plane, and accordingly between the two wheels carried on the axle outside the leaf springs.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A device for limiting rotation of a wheel axle received in an eye of a leaf spring's wrapped end, the device comprising:
   a sleeve having a peripheral wall extending about an axis and dimensioned to fit circumferentially about the wheel axle inside the eye of the leaf spring with an inner surface of the peripheral wall situated against an outer peripheral surface of the wheel axle; and
   a tab projecting outward from the peripheral wall of the sleeve and extending in a direction parallel to the axis;
   whereby, with the sleeve fixed to the wheel axle to extend thereabout within the eye of the leaf spring and the tab projecting into a gap left between the leaf spring and the wrapped end thereof, contact between the tab and the leaf spring blocks rotation about the axis of the wheel axle and sleeve relative to the wrapped end of the leaf spring.

2. The device according to claim 1 wherein the peripheral wall of the sleeve is flanged adjacent one end thereof to define a flange on only one side of the leaf spring to block axial sliding of the sleeve in a respective direction by contact of the flange with a face of the wrapped end of the leaf spring.

3. The device according to claim 2 wherein the flange is situated at an end of the sleeve.

4. The device according to claim 1 wherein the tab is integral with the peripheral wall of the sleeve.

5. The device according to claim 1 wherein the tab is defined by a bent portion of the peripheral wall.

6. The device according to claim 5 wherein sleeve is split to form a break in the peripheral wall thereof and the bent portion of the peripheral wall is formed by an end thereof defined at a respective side of the break.

7. The device according to claim 1 wherein the tab is bent back over itself between a proximate end of the tab connected to the peripheral wall of the sleeve and a distal end of the tab opposite the connection thereof to the sleeve.

8. The device according to claim 7 wherein the tab smoothly curves from the proximate end of the tab to the distal end of the tab.

9. A suspension system comprising:
   a leaf spring having a wrapped end defining an eye extending along an axis transverse to the leaf spring with a gap left between the leaf spring and the wrapped end thereof;
   a wheel axle received in the eye of the leaf spring;
   a rotation limiting device fixed to the wheel axle and comprising a sleeve having a peripheral wall extending circumferentially about the wheel axle inside the eye of the leaf spring and a tab projecting outward from the peripheral wall of the sleeve and extending in a direction parallel to the axis, an inner surface of the peripheral wall being situated against an outer peripheral surface of the wheel axle and the tab projecting into the gap left between the leaf spring and the wrapped end thereof to block rotation about the axis of the wheel axle and sleeve relative to the wrapped end of the leaf spring by contact between the tab and the leaf spring.

10. The suspension system according to claim 9 wherein the peripheral wall of the sleeve is flanged outside the eye on only one side of the leaf spring to block axial sliding of the sleeve in a respective direction by contact of a flange on said peripheral wall of the sleeve with a face of the wrapped end of the leaf spring.

11. The suspension system according to claim 10 wherein the flange is situated at an end of the sleeve.

12. The suspension system according to claim 10 wherein the flange is disposed on an inner side of the leaf spring opposite an end of the wheel axle adjacent the leaf spring.

13. The suspension system according to claim 9 wherein the tab is integral with the peripheral wall of the sleeve.

14. The suspension system according to claim 9 wherein the tab is defined by a bent portion of the peripheral wall.

15. The suspension system according to claim 14 wherein sleeve is split to form a break in the peripheral wall thereof and the bent portion of the peripheral wall is formed by an end thereof defined at a respective side of the break.

16. The suspension system according to claim 9 wherein the tab is bent about an end edge formed at the intersection of an inner surface of the leaf spring's wrapped end facing into the eye and an end surface of the leaf spring's wrapped end defining one side of the gap between the wrapped end and the leaf spring.

17. The suspension system according to claim 16 wherein the tab smoothly curves about the end edge.

18. The suspension system according to claim 9 wherein the rotation limiting device is welded to the wheel axle.

* * * * *